(12) United States Patent
Flessner et al.

(10) Patent No.: US 11,830,226 B2
(45) Date of Patent: Nov. 28, 2023

(54) COMPUTER-IMPLEMENTED METHOD FOR COMPRESSING MEASUREMENT DATA FROM A MEASUREMENT OF A MEASUREMENT VOLUME

(71) Applicant: Volume Graphics GmbH, Heidelberg (DE)

(72) Inventors: Matthias Flessner, Heidelberg (DE); Christoph Poliwoda, Heidelberg (DE); Christof Reinhart, Heidelberg (DE); Thomas Günther, Heidelberg (DE)

(73) Assignee: VOLUME GRAPHICS GMBH, Heidelberg (DE)

( * ) Notice: Subject to any disclaimer, the term of this patent is extended or adjusted under 35 U.S.C. 154(b) by 435 days.

(21) Appl. No.: 17/277,703

(22) PCT Filed: Aug. 5, 2019

(86) PCT No.: PCT/EP2019/071047
§ 371 (c)(1),
(2) Date: Mar. 18, 2021

(87) PCT Pub. No.: WO2020/057849
PCT Pub. Date: Mar. 26, 2020

(65) Prior Publication Data
US 2022/0114765 A1 Apr. 14, 2022

(30) Foreign Application Priority Data
Sep. 18, 2018 (DE) .................... 10 2018 122 842.2

(51) Int. Cl.
*G06T 15/08* (2011.01)
*G06T 9/00* (2006.01)
*G06T 15/10* (2011.01)

(52) U.S. Cl.
CPC .............. *G06T 9/007* (2013.01); *G06T 15/08* (2013.01); *G06T 15/10* (2013.01)

(58) Field of Classification Search
CPC ........... G06T 9/007; G06T 9/00; G06T 15/08; G06T 15/10; H04N 19/00
See application file for complete search history.

(56) References Cited

U.S. PATENT DOCUMENTS

2007/0065032 A1* 3/2007 Hernandez .......... H04N 19/115
375/E7.076
2009/0169119 A1 7/2009 Wegener
(Continued)

FOREIGN PATENT DOCUMENTS

EP 3166315 A1 * 5/2017
GB 2524956 A * 10/2015
(Continued)

OTHER PUBLICATIONS

European Patent Office/ISA, International Search Report and Written Opinion for PCT Application No. PCT/ EP2019/071049, dated Nov. 20, 2019.
(Continued)

*Primary Examiner* — Carol Wang
(74) *Attorney, Agent, or Firm* — SoCal IP Law Group LLP; Angelo J. Gaz (57) ABSTRACT

Described is a method for compressing measurement data of a volume which comprises an object, wherein a digital representation of the object comprising a plurality of image information items of the object is generated by the measurement. The method comprises: providing an analysis specification for at least one predetermined region in the measurement volume; determining the measurement data in the measurement volume; defining a subset of the measurement data which corresponds to the at least one predetermined region of the analysis specification; selecting at least one
(Continued)

compression rate for the subset on the basis of the analysis specification; selecting a first compression method for a remainder of the measurement data outside the subset, the first compression method having a compression rate; compressing the subset with the selected at least one compression rate, and compressing the remainder of the measurement data by way of the first compression method.

14 Claims, 3 Drawing Sheets

(56) References Cited

U.S. PATENT DOCUMENTS

2012/0303309 A1 11/2012 Stuke et al.
2018/0365836 A1* 12/2018 Liao ..................... G06V 10/235

FOREIGN PATENT DOCUMENTS

| | | | |
|---|---|---|---|
| JP | 4064022 B2 | * | 3/2008 |
| KR | 101436894 B1 | * | 9/2014 |
| WO | WO-2017181429 A1 | * | 10/2017 |
| WO | 2020/057849 A1 | | 3/2020 |

OTHER PUBLICATIONS

Behravan Vahid et al, "Adaptive compressive sensing of 3D point clouds", 2017 IEEE 2nd International Conference on Signal and Image Processing (ICSIP), IEEE , Aug. 4, 2017 (Aug. 4, 2017), p. 188-192.

German Patent Office, Office Action for German Patent Application No. 10 2018 122 842.2, dated May 28, 2019.

* cited by examiner

COMPUTER-IMPLEMENTED METHOD FOR COMPRESSING MEASUREMENT DATA FROM A MEASUREMENT OF A MEASUREMENT VOLUME

RELATED APPLICATION INFORMATION

This patent claims priority from International PCT Patent Application No. PCT/EP2019/071047, filed Aug. 5, 2019 entitled, "COMPUTER-IMPLEMENTED METHOD FOR COMPRESSING MEASUREMENT DATA FROM A MEASUREMENT OF A MEASUREMENT VOLUME", which claims priority to German Patent Application No. DE 10 2018 122 842.2, filed Sep. 18, 2018 all of which are incorporated herein by reference in their entirety.

The invention relates to a computer-implemented method for compressing measurement data from a measurement of a measurement volume.

A multiplicity of methods are known for the measurement and subsequent mapping of objects, such as, for example, workpieces. Very large quantities of data are sometimes generated during a single measurement procedure depending on the desired level of detail of the mapping. This is the case, for example, particularly during inline workpiece testing in which a multiplicity of workpieces are measured and analyzed with high frequency. The measurement data from measurements of the examined workpieces are frequently archived for subsequent traceability. However, large data memories are required for the data thereby generated. This applies particularly to tomographic methods such as computer tomography. A multiplicity of methods for compressing measurement data are known for reducing the large memory requirement of the measurement data of objects.

Compression methods are known which compress measurement data in a lossless manner. The compression rate is defined as the ratio between the uncompressed data quantity and the compressed data quantity. A compression rate of one accordingly means no reduction in the data quantity, whereas the data quantity is more strongly compressed with an increasing compression rate. In the medical engineering application of computer tomography, for example, the compression rates therein can be around two. It is further possible to compress measurement data in a lossy manner, wherein higher compression rates are achieved here. However, the measurement data are then corrupted. No data errors or only minor data errors could be observed up to a compression rate of 15 in medical engineering. Methods are further known from medical engineering which divide the dataset into regions of differing relevance. The regions marked by the user as relevant are compressed losslessly or with only minor losses, whereas greater losses can be accepted in the remaining regions and therefore a higher compression rate can be achieved. A locally adaptive compression is therefore provided.

U.S. Pat. No. 9,869,645, using the example of workpiece testing, describes the search for defects in the object. The positions at which defects are searched for can be predefined in a volumetric representation of the object. Defects are then searched for at the predefined positions. A region of interest (ROI) is defined around identified defects. The data inside the ROI are less strongly compressed than those outside the ROI. The disadvantage here is that a traceability of the analysis results cannot be reliably provided, since regions in which, erroneously, no defects have been detected are strongly compressed.

The object is therefore to provide a computer-implemented method which improves the compression rate of the measurement data and the application of analyses to the measurement data.

Main features of the invention are indicated herein.

In one aspect, the invention relates to a computer-implemented method for compressing measurement data from a measurement of a measurement volume which comprises an object, wherein a digital representation of the object is generated by means of the measurement, wherein the object representation has a multiplicity of image information elements of the object, wherein the method comprises the following steps: providing an evaluation rule for at least one predetermined region in the measurement volume, determining the measurement data in the measurement volume, defining a subregion of the measurement data corresponding to the at least one predetermined region of the evaluation rule, selecting a compression rate for the subregion on the basis of the evaluation rule, selecting a first compression method from a multiplicity of compression methods for a residual region of the measurement data outside the subregion, wherein the first compression method has a compression rate which is higher than the selected compression rate for the subregion, compressing the subregion with the selected compression rate, and compressing the measurement data in the residual region with the first compression method.

The steps of selecting a compression rate for the subregion on the basis of the evaluation rule and selecting a first compression method from a multiplicity of compression methods for a residual region of the measurement data outside the subregion can be carried out successively in any sequence or simultaneously.

The invention thus provides an evaluation rule which predefines the regions of the measurement data in which a high quality of the data is required for an evaluation. These regions can also be disposed outside the object in order to analyze its surfaces and their external surroundings. The region outside the subregion defined with the evaluation rule in which the determined measurement data of the measurement volume are intended to be more strongly compressed than inside the subregion which designates the relevant analysis positions on the examined object is thereby predefined. The selection of the at least one selected compression rate in the subregion or of a corresponding compression method can also be derived from the evaluation rule and/or predefined. The at least one selected compression rate for the subregion and the first compression method for the residual region can thereby be selected. The at least one selected compression rate for the subregion is selected on the basis of the evaluation rule. In one example, the measurement data which are disposed in the subregion can also be subject to no compression so that the original measurement data can be stored directly without compression. Since a compression with a higher compression rate nevertheless takes place outside the subregion, a high average compression rate can be achieved for the entire measurement data without the relevant data being corrupted. If a compression rate higher than one is selected for the subregion, a corruption of the relevant data can similarly be avoided or only a negligible corruption of the data in the subregion can be expected. This is expedient, particularly in the case of computer tomographic methods, since the actually relevant regions often represent only a small part of the voxels. The remaining voxels are required for orientation only. Since the component can be scanned completely with computer tomographic methods, this facility for orientation in the dataset offers an advantage over other sensors. A flexible parameterization of the compression of the measurement data by means of the evaluation rule further enables the measurement data compression to be optimized in terms of the type of analysis that is to be carried out locally. In this context, a parameterization of the compression means that it is possible to specify in a spatially resolved manner how strongly the data are to be compressed, wherein this can be specified, for example, by way of a compression rate, but also which method is to be used for the compression. The invention provides an automatic definition of the parameterization of the compression by means of the evaluation rule, wherein said automatic definition, compared with the manual definition of the parameterization, particularly given that 3D data are involved, takes significantly less time and is less susceptible to error. Moreover, only an automation of the parameterization enables a level of detail in the definition of subregions of the measurement data, particularly on projection data, which is not achievable manually. This further increases the average compression rate of the measurement data. The processing of the entire subregion with the selected compression rate ensures that the analysis results in the subregion are not corrupted, or are not significantly corrupted, by the compression. Analysis results in the predetermined regions can thereby be traced, even following compression. Furthermore, less storage space for the archiving of data and less bandwidth for the data transport are required due to the increased average compression. A computer-implemented method is thus provided which improves the compression rate of the measurement data and the application of analyses to the measurement data.

The evaluation rule is typically defined on a nominal geometry of the workpiece that is to be examined and therefore in the workpiece coordinate system. In order to enable a correct assignment of the corresponding regions in the measurement data, the workpiece coordinate system can be determined, for example, in the measurement data or on the basis of the geometry recorded by the measurement data. For this purpose, for example, the measurement data can be adapted to the nominal geometry. Defined geometries can further be recorded and the measurement data can be aligned by means of the 3-2-1 registration known from the prior art. This step can also be referred to as registration. A further method which can be used for the registration is the analysis of features that are reliably detectable in the measurement data, such as corners, edges, spheres or regions with a high or characteristic curvature which can be assigned to the nominal geometry.

In one example, the predetermined region can be referred to as a region of interest.

The digital representation of the object can further be a two-dimensional object representation or a three-dimensional object representation.

The step of selecting a compression rate for the subregion can comprise: selecting a second compression method from the multiplicity of compression methods for the subregion on the basis of the evaluation rule, wherein the second compression method has a lower compression rate than the first compression method, and wherein the step of compressing the subregion with the selected compression rate comprises: compressing the measurement data in the subregion with the second compression method.

If the compression rate for the subregion is selected as higher than one, the compression in the subregion can be performed with a second compression method which can differ from the first compression method. As a result, for example, the first compression method for the region outside the subregion can be lossy and the second compression method in the subregion can be lossless. Due to the accepted data losses outside the subregion, the required storage space can be further reduced due to the compression.

The evaluation rule can be derived from a digital design drawing of the object, wherein the digital design drawing has tolerance values for the at least one predetermined region of the object. Alternatively or additionally, the evaluation rule can have, for example, a definition of at least one analysis method which is to be carried out on the at least one predetermined region of the object, wherein the at least one analysis method which is to be carried out defines a target data quality for the at least one predetermined region. Alternatively or additionally, the evaluation rule can further determine the second compression method depending on an analysis method that is to be carried out in the predetermined region.

A digital design drawing of the object is understood to mean a representation of the object which has data which are required for a manual or automatic production of the object. The representation of the object of the digital design drawing can be two-dimensional or three-dimensional. With the tolerance values, the digital design drawing comprises information indicating the extent to which a produced object is allowed to deviate from the dimensions specified by the digital design drawing. In one example, predetermined regions which define regions in which an analysis of the data is intended to be performed can be derived on the basis of the tolerance values. It is thus possible to analyze, for example, whether the object has dimensions which lie within or outside the tolerances. Predetermined regions which are of particular importance for an alignment, for example for determining the workpiece coordinate system or for registering the measurement data and/or in which further analyses or types of analysis are intended to be carried out can further be derived from the digital design drawing. In the case of measurement data which have been obtained using computed tomography, for example, this may involve porosity and inclusion analyses or fibrous composite analyses. Depending on the measurement task of the analysis method and the associated tolerance, locally different minimum requirements in respect of data quality and therefore the maximum permissible corruption of the measurement data can therefore be imposed in different predetermined regions, so that locally the most suitable compression method can be selected in the subregion, i.e. so that the highest compression rate meeting the minimum data quality requirements defined by the respective analysis methods can vary between different predetermined regions in the subregion. One example of this is the performance of a porosity analysis in which defects need to be detected as from a defined minimum quantity, from which a target data quality can be derived for the that which is to be analyzed. Nevertheless, each of the at least one selected compression rates in the subregion is lower than in the residual region, regardless of analyses already carried out or planned.

Before the compression of the measurement data in the residual region, the method can comprise the following steps: defining a transitional region of the measurement data of the residual region, wherein the transitional region separates the residual region from the subregion, selecting a third compression method from the multiplicity of compression methods for the transitional region, wherein the third compression method has a compression rate which is higher than the selected compression rate for the subregion, and has a lower compression rate than the first compression method, and compressing the measurement data in the transitional region with the third compression method.

The definition of the predetermined regions in the measurement data can have an uncertainty, so that relevant regions disposed peripherally are not covered by the evaluation rule. If the subregion does not completely encompass a relevant region of the measurement data, the negative effects can then be reduced with the use of a third or even further compression methods. A wide variety of image artifacts which could result in erroneous analysis results in evaluation methods can further be expected at hard boundaries of regions with significantly different compression.

The third compression method can further have a position-dependent compression rate, wherein the compression rate increases in the transitional region from the subregion to the residual region.

A smooth transition between the at least one selected compression rate and the compression rate of the second compression method can thus be achieved between the subregion and the residual region with the third compression method. This further reduces the formation of artifacts. This similarly further improves the results of the analyses performed on the compressed data. Furthermore, the situation can thus be avoided in which peripheral regions which, for example, indirectly have an influence on the performed evaluations or are relevant to the determination of a workpiece coordinate system are no longer usable for this determination due to a sudden change of the compression rates and the possibly accompanying data losses.

Following the definition of the subregion of the measurement data corresponding to the predetermined region of the evaluation rule, the method can further comprise the following step: extending the subregion by a predefined safety margin.

The taking into account of a predefined safety margin can be provided alternatively or additionally to the performance of the third compression method. The situation in which the peripheral regions of the at least one predetermined region do not completely encompass relevant regions for the analysis or the alignment with a workpiece coordinate system can be avoided by means of the safety margin.

The image information can indicate a value of a measurement parameter for the object at a defined position of the object.

The image information can thus be information at a position of the object defined by three dimensions. This image information can result e.g. from a calculation which is based on a computer tomographic measurement. In this case, the defined positions of the object form a three-dimensional grid or voxel lattice, wherein each lattice point maps the local x-ray absorption in the measurement volume as image information. This representation can be referred to as a voxel representation.

The image information can further be a three-dimensional point cloud which maps the object volume, wherein the image information is assigned to points of a surface of the object and their coordinates in space. The individual points can be connected here also, as in the STL file format, e.g. in order to form an enclosed surface and map information relating to the orientation of the surface. In this case, the image information can result e.g. from an optical scanning of the object. This optical scanning can be performed from at least two angles of view, so that a three-dimensional position of the image information on the surface of the object can be determined.

Furthermore, it is also possible in this example to determine a representation of the surface from a three-dimensional voxel representation. However, other types of measurement parameters at defined positions of the object are also possible.

A compression of this voxel representation or surface data can be performed at different times. If the compression is carried out before the execution of the evaluation rule, for example for data transmission, it must be ensured that the results of the evaluation rule are not influenced or are not significantly influenced as a result. If the compression is carried out after the execution of the evaluation rule, for example for archiving, it must be ensured for traceability that a further evaluation produces the same or not significantly influenced results. The compression requirements do not therefore differ in these cases.

Different methods can be used to compress the voxel representation. Examples of these are lossless and lossy algorithms for image or video compression which are used by formats such as GIF, PNG, JPEG or MPEG. These can be applied to individual layers of the voxel representation, but also to the three-dimensional representation. It is further possible to reduce or vary the resolution or bit depth of the voxel representation locally. Further methods are similarly conceivable.

Different methods can also be used for compressing the surface representation, for example a (local) reduction of the density of the stored surface points or a reduction of the resolution at which the coordinates of these points are stored.

The image information can similarly indicate a value of a measurement parameter along a projection line through the object which has been determined, for example, in a radiographic examination of the measurement volume by means of x-ray radiation and scanning of the unabsorbed x-ray radiation by means of a detector. In the case of this image information which is normally disposed in a two-dimensional grid or pixel lattice, each lattice point can thus map the x-ray absorption by the object along projection lines. These data can be referred to as projection data. If projection data of the measurement volume are acquired from different angle settings, the aforementioned voxel representation of the local x-ray absorption can be reconstructed therefrom. This step is referred to as reconstruction. An evaluation rule is typically defined in relation to the three-dimensional representation and not in relation to the projection data.

A compression of these projection data can similarly be performed at different times. The projection data can be compressed before the performance of the reconstruction, for example if a data transfer is necessary for the reconstruction. Furthermore, the projection data can also be compressed after the performance of the reconstruction in order to archive the projection data and enable a subsequent, further reconstruction. The compressed data can, for example, be stored for the subsequent analysis and/or can be transmitted via data connections to, possibly distributed, electronic data processing systems in order to structurally separate the calculation and analysis of the tomographic images from the recording of the measurement data. In this case, the three-dimensional data can be reproduced from the projection data so that a separate archiving is not necessary. This reduces the required storage space. The compression must in turn equally ensure in all cases that the results of the execution of the evaluation rule are not, or not significantly, corrupted.

The projection data can be interpreted as individual, two-dimensional projections, but also as a three-dimensional stack or three-dimensional image dataset. The same aforementioned methods, inter alia, which can also be used for the compression of the voxel representation can therefore be used for the compression of the projection data.

The image information to be compressed can comprise the projection data obtained from a computer tomographic measurement before the execution of the evaluation rule. In this way, following an approximate determination of the workpiece coordinate system with which a preliminary alignment of the measurement data is achieved, the measurement data can be compressed before the actual processing in such a way that the relevant regions are nevertheless covered by the subregions.

The image information can similarly indicate a value of a distance to a nearest surface of the object, for example for lattice points of a three-dimensional grid.

The image data thus form an implicit representation of the surface of the object, known as a distance field. The distance field can therefore alternatively or additionally be stored with a locally varying bit depth or the resolution can be reduced or varied locally. A plurality of voxels can thus be grouped in unimportant regions and can be written with a common grey value, thus reducing the storage requirement.

The step of defining a subregion of the measurement data corresponding to the predetermined region of the evaluation rule can comprise a reverse projection of the predetermined region onto the object representation.

The reverse projection can, for example, determine regions of projection data which are assigned to the region of the object representation predetermined in the evaluation rule in order to be able to define thereafter the subregion of the measurement data in the projection data. In this case, this reverse projection means, inter alia, that those regions of the projection data are identified which have a significant influence on the subregion of the measurement data in the reconstruction. This may involve those regions of the projection data whose projection lines intersect the subregion of the measurement data. Since the evaluation plan is typically defined on the basis of the workpiece coordinate system which is defined in turn on a three-dimensional object representation, the aforementioned identification of these regions within the projection data is not trivial.

For this purpose, the imaging geometry which defines, inter alia, a positioning and orientation of the object, i.e. pose of the object, in the measurement volume can first be taken into account.

Alternatively or additionally, an analysis of the projection data can be performed with prior knowledge of the component geometry in order to determine the pose of the component in the measurement volume. It is furthermore alternatively or additionally possible to ensure through a defined arrangement of the object in the measurement volume that the object is always located in a defined, known pose in the measurement volume. The workpiece coordinate system can further be scanned by e.g. optical or tactile sensors on the measured object in the measurement volume.

The step of defining a subregion of the measurement data corresponding to the predetermined region of the evaluation rule can be performed on the basis of a measurement parameter for the object at a defined position of the object, wherein the measurement parameter is calculated from one out of the multiplicity of image information elements.

A reconstruction, for example, can be performed for this purpose in order to enable a retrospective assignment to the projection data on the basis of the volume measured by the reconstruction. A preliminary workpiece coordinate system, for example, can be created in order to align the measurement data in such a way that the predetermined regions in the object representation can be determined by means of the evaluation rule.

The method can comprise the following step: aligning a coordinate system of the measurement data with a coordinate system appropriate to the evaluation rule on the basis of a part of the measurement data before the compression of the measurement data.

The reconstruction can thus be performed, for example, at reduced resolution in order to minimize the required computing time. Alternatively, only a part of the projection data can furthermore be used for the reconstruction or only those regions which are necessary for an alignment of the measurement data are reconstructed. By means of this reconstruction, a preliminary workpiece coordinate system, for example, can be created in order to align the measurement data in such a way that the predetermined regions in the object representation can be determined by means of the evaluation rule.

The information indicating which regions are affected by which parameterization can further be stored. In this way, a warning can be issued, for example, during a subsequent performance of an analysis if an analysis is carried out on a region with unsuitable compression. The situation is thus avoided wherein, for example due to an erroneous preliminary registration, analyses are performed unnoticed in a region in which the measurement data have been too severely corrupted due to the compression, as a result of which corrupted analysis results can be expected.

In a further aspect, the invention relates to a computer program product with instructions executable on a computer which, when executed on a computer, cause the computer to carry out the method according to the preceding description.

Further features, details and advantages of the invention are set out in the wording of the claims and in the following description of example embodiments with reference to the drawings. In the drawings:

Features which are similar or identical to one another are denoted below with the same reference numbers.

Figure 1A:
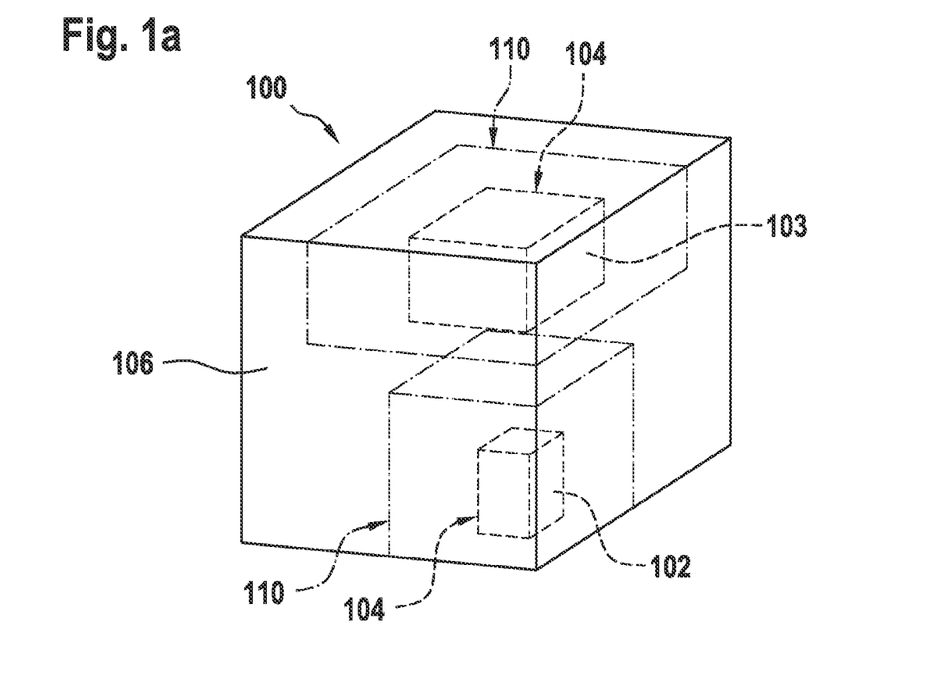
FIG. 1a, b show a schematic representation of an object by means of a three-dimensional voxel representation, FIG. 2a, b show a schematic representation of an object from projection data.

FIG. 1a shows a schematic view of a digital representation of an object, referred to as an object representation 100, which is shown by means of a three-dimensional voxel representation. The object representation 100 has been produced from a measurement of a measurement volume in which the object is disposed. The three-dimensional voxel representation comprises a multiplicity of voxels which are disposed at defined positions in the entire volume of the object representation 100. The voxels define positions at which a measurement parameter for the object is determined from the measurement data, wherein the value of the measurement parameter is indicated by means of image information at the defined position in the object representation 100. The image information of the three-dimensional voxel representation is determined by means of measurement data from a measurement of the measurement volume in which the object is disposed.

In order to perform an analysis of the measurement data or apply an evaluation rule to the measurement data, a workpiece coordinate system of the object can first be determined. This determines the alignment and the orientation of the object in the measurement volume. The workpiece coordinate system or the alignment and orientation of the object can be determined provisionally. Specific positions and regions in the object representation 100 can be identified as soon as the workpiece coordinate system of the object has been determined.

The object representation 100 can then be processed by means of the computer-implemented method according to the invention for compressing measurement data from the measurement of a measurement volume in order to achieve a compression of the measurement data from the measurement volume. The method can provide an evaluation rule which can relate to at least one predetermined region in the measurement volume. A subregion 104 of the measurement data is defined from the at least one predetermined region. This subregion 104 of the measurement data corresponds to the at least one predetermined region.

In one example, the evaluation rule can have information indicating which analysis methods are intended to be carried out within the predetermined regions. At least one compression rate for the subregion is further selected from this information. This at least one compression rate can be referred to as at least one selected compression rate for the subregion. In this example, the at least one selected compression rate can furthermore also be regarded as the maximum compression rate that is allowed to be applied for the subregion without the analysis methods determining different or significantly different results from the uncompressed data and the data reconstructed from the compressed data.

In one example, the at least one selected compression rate for the subregion allows only compression methods which operate losslessly. The at least one selected compression rate can therefore also be one. The at least one selected compression rate can further vary over the subregion.

In FIG. 1a, the subregion 104 is recorded in the object representation 100. In FIG. 1a, the subregion 104 is divided into two sub-subregions 102, 103, since two predetermined regions are defined in the evaluation rule in this example. However, the subregion 104 can comprise any number of sub-subregions 102, 103 which do not have to be interconnected.

The subregion 104 can optionally be extended by a safety margin. To do this, regions which are located at the periphery of the subregion 104 are incorporated into the subregion 104. Relevant regions which are required for an evaluation or precise alignment of the measurement data can thus be prevented from remaining disposed outside the subregion 104.

The voxels which are located outside the subregion 104 are disposed in the residual region 106.

A first compression method having the highest possible compression rate is selected by the method for the measurement data in the residual region 106. The compression rate of the first compression method is higher than the at least one selected compression rate for the subregion 104.

+Since no analyses are provided by the evaluation rule for the measurement data which are disposed in the residual region 106, the first compression method can cause data losses in the compression, so that all information is no longer available thereafter in the residual region 106.

The measurement data in the residual region 106 can then be compressed with the first compression method.

The measurement data in the subregion 104 can be compressed at the at least one selected compression rate by means of a second compression method.

Due to the different compression rates, the measurement data in the residual region 106 are more strongly compressed than the measurement data which are disposed in the subregion 104. If the at least one selected compression rate is one, the subregion 104 can also be subjected to no compression or can be stored unchanged. Since the subregion 104 is relatively small compared with the residual region 106, a relatively high average compression rate is nevertheless achieved over all measurement data without relevant measurement data in the subregion 104 being lost.

A transitional region 110 which separates the subregion 104 from the residual region 106 can optionally be defined between the subregion 104 and the residual region 106. A third compression method having a compression rate which lies between the at least one selected compression rate for the subregion 104 and the compression rate of the second compression method can be selected in the transitional region.

The compression rate of the third compression method can also vary, wherein the compression rate increases from a position close to the subregion 104 to a position close to the peripheral region 106. A sudden change in the compression rate between the subregion 104 and the peripheral region 106 can thus be avoided. This avoids artifacts in the compressed data and similarly ensures relevant regions of the measurement data that have not been completely covered by the subregion 104 being subjected, if at all, only to minor data losses due to the compression.

In the embodiment in which the object representation 100 is created by means of surface data, the points of the object are disposed only on the surfaces of the object and not in its volume. The subregion 104, the transitional region 110 and the residual region 106 would then similarly be located only on the surface of the object.

Figure 1B:
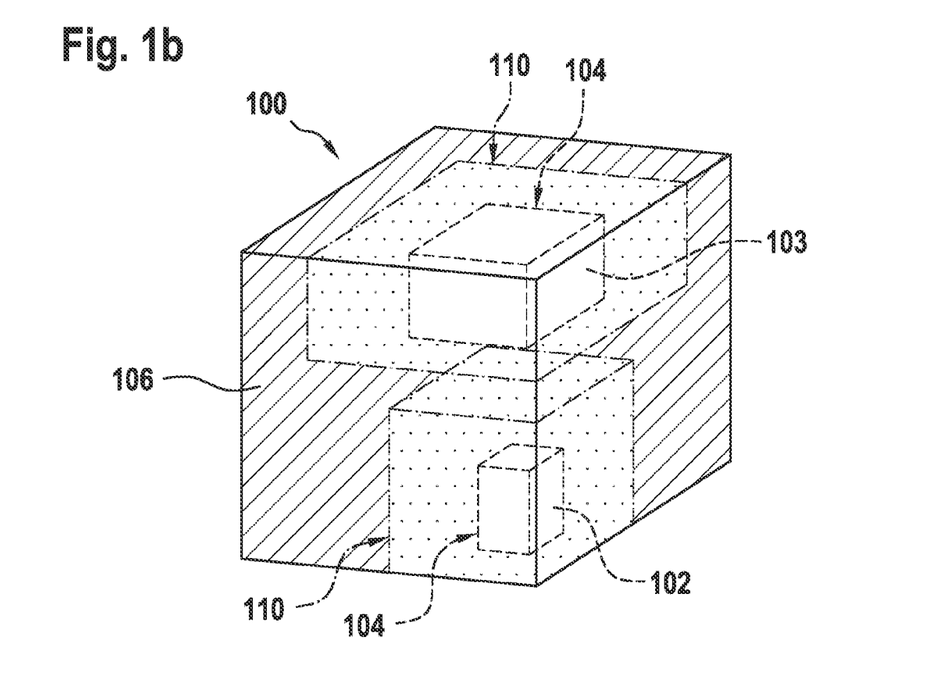

FIG. 1b shows the object representation 100 after a compression of the object representation 100 has been performed. The hatching in the residual region 106 represents a compression by the first compression method in which data losses have taken place. The data have been losslessly compressed within the subregion 104. Points which indicate a smaller data loss than in the residual region 106 are shown in the transitional region 110.

All analyses which are required, for example for a quality assessment of the object, can therefore be carried out in the subregion 104. The residual region 106 and the transitional region 110 can be used for orientation within the object representation 100.

Figure 2A:
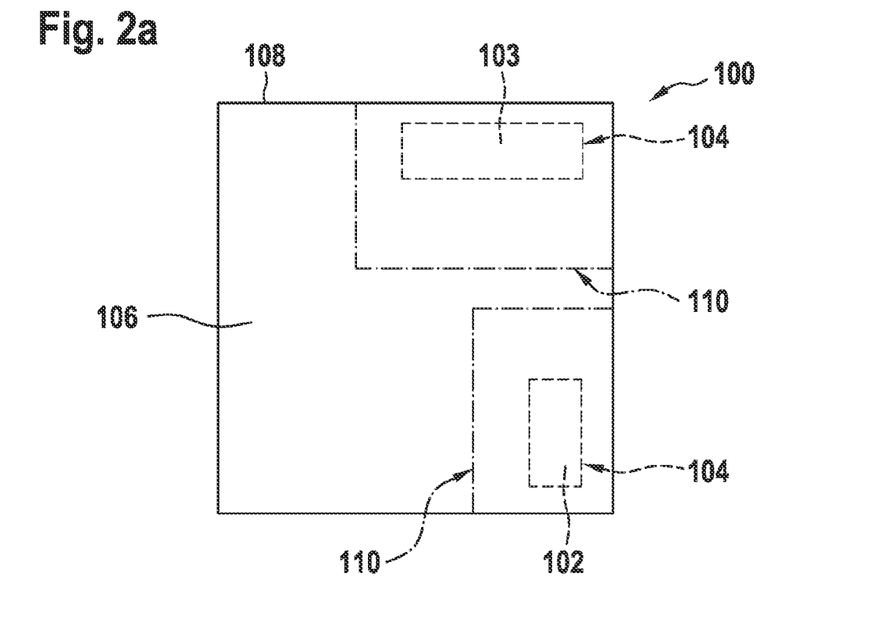

FIG. 2a illustrates an object representation 100 having measurement points of a projection 108 which have image information indicating a value of a measurement parameter along a projection line through the object. The object representation 100 is therefore a projection of the object. The projection dataset consists of a multiplicity of projections which have been recorded from different directions.

In the same way as for the object representation 100 in FIG. 1a, a subregion 104 which has been selected on the basis of the evaluation rule can be defined for the object representation 100 in FIG. 2a.

The residual region 106 of the object representation 100 is defined with the subregion 104. Furthermore, a transitional region 110 which is disposed between the subregion 104 and the residual region 106 can similarly be provided.

Figure 2B:
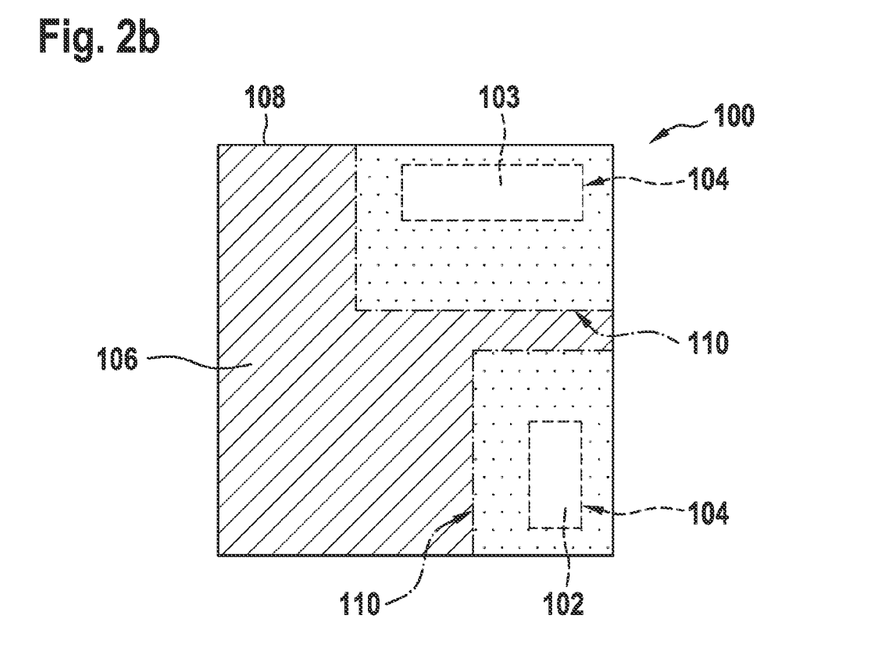

A representation from the compressed data from FIG. 2a is shown in FIG. 2b. The description for FIG. 1b can be read in a similar manner to FIG. 2b, so that reference is made in this respect to the preceding description.

Figure 3:
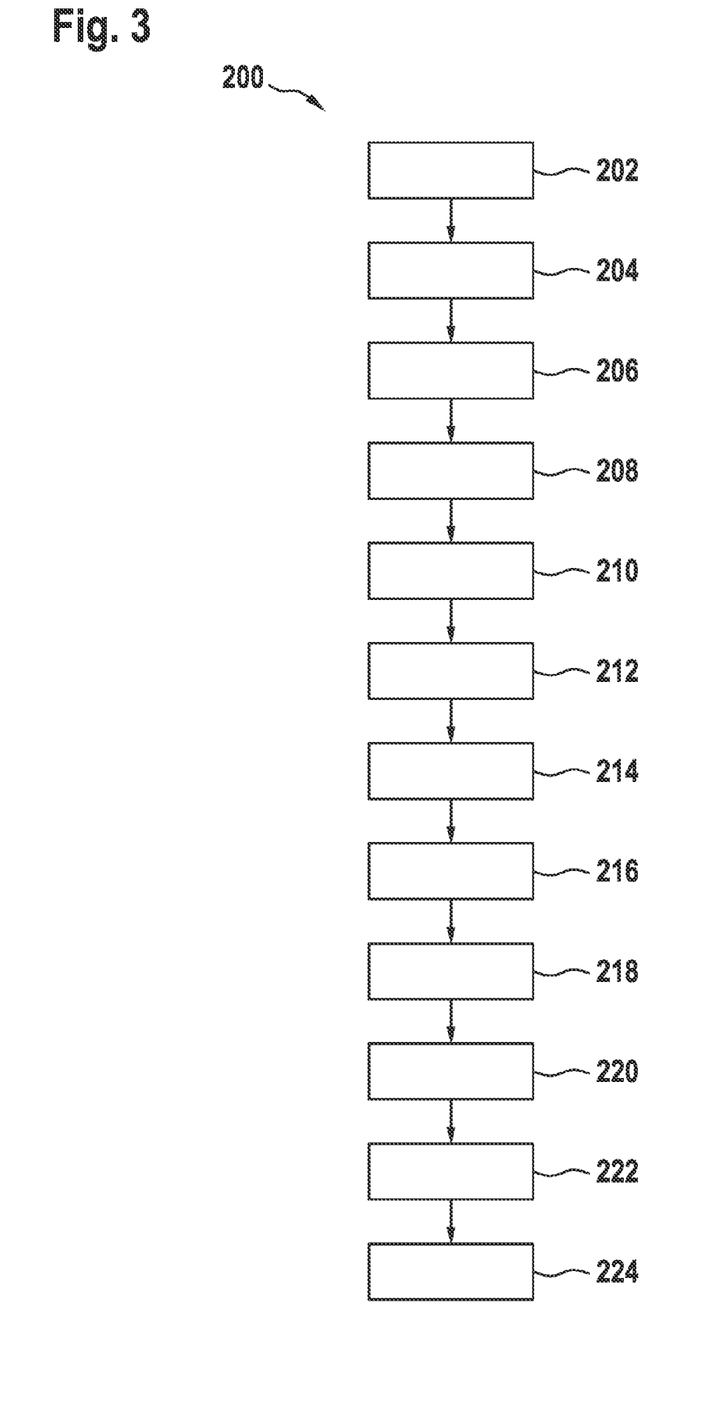
FIG. 3 shows a flow diagram of the method according to the invention.

FIG. 3 shows a schematic flow diagram of the method 200 for compressing the measurement data from a measurement of a measurement volume.

The measurement data are determined from a measurement volume in which an object is disposed. A digital representation of the object is produced through the measurement, wherein the object representation has a multiplicity of image information elements of the object. The object representation can be a three-dimensional representation or a two-dimensional representation. The three-dimensional representation can consist, for example, of three-dimensional voxel data from which tomographic sections can be extracted. Alternatively, the three-dimensional representation can, for example, also be a three-dimensional surface representation of the object. In both of the aforementioned examples, the image information indicates a value of a measurement parameter for the object at a defined position of the object. In this example, the evaluation rule can describe the extent to which the stored surface points are allowed to be reduced locally by the compression methods or the bit depth with which the coordinates of the individual points are intended to be stored.

The two-dimensional object representation can consist, for example, of projection data of the object. In this example, the image information indicates a value of a measurement parameter along a projection line through the object.

In a further example, the image information can indicate a value of a distance to a nearest surface of the object. In this example, the data can be stored e.g. with locally varying bit depth, or the resolution can be reduced or varied locally.

Before the method, in a first method step 202, the measurement data can optionally be aligned with a coordinate system appropriate to the evaluation rule on the basis of a part of the measurement data. This workpiece coordinate system can effect a preliminary alignment of the object representation. If the compression is performed before the evaluation of the measurement data, e.g. for a data transmission before the evaluation, a final, precise alignment can also take place after the compression but before the analysis.

In a following method step 204, an evaluation rule is provided for at least one predetermined region in the measurement volume.

In one example, the evaluation rule can be derived from a digital design drawing of the object, wherein the digital design drawing has tolerance values for the at least one predetermined region of the object.

Alternatively or additionally, the evaluation rule can further have a definition of at least one analysis method which is to be carried out on the at least one predetermined region of the object, wherein the at least one analysis method which is to be carried out defines a target data quality for the at least one predetermined region. The target data quality guarantees that the analyses of the measurement data can be performed with sufficient quality.

Further examples of analysis types which can be defined by an evaluation rule relate to how and on which geometry elements a registration, i.e. the determination of the workpiece coordinate system, is carried out, or where geometry elements are fitted in order to perform dimensional measurements in terms of amount, shape and position, if necessary including an indication of a tolerance. The evaluation rule can further define regions in which a target/actual comparison or wall thickness analysis is carried out, regions in which analyses in terms of defects, inclusions, porosity, foam structure or a fibrous composite analysis are carried out, regions in which numerical simulations, for example structural/mechanical simulations or simulation of transport phenomena are carried out, and/or regions or cutaway views which are intended to be exported as an image file for a visual inspection—these may, for example, be views of particularly critical regions in order to enable a verification of the analysis result. The evaluation rule thus defines, inter alia, the types of analysis to be carried out locally.

In one example, the compression parameterization appropriate to an evaluation rule can be obtained by means of simulations of the measurements and analyses. By means of the simulation and subsequent evaluation of the measurement with uncompressed data and data reconstructed from compressed data, it is possible to ascertain which compression parameterization results in which corruption of the measurement result. The locally most advantageous parameterization for each at least one predetermined region can be identified therefrom.

Alternatively or additionally, the evaluation rule can be founded on empirical knowledge and preliminary investigations and can have a look-up table which permits an assignment of a parameterization according to the requirements.

Further requirements can also be taken into account, e.g. the minimum size of pores and fibers to be detected, the minimum size of correctly measurable geometrical structures, i.e. the structure resolution, or a maximum value for the compression-related smearing of the data, i.e. for the point spread function.

The method further has the method step 206 with which measurement data are determined in the measurement volume. The measurement data can be determined e.g. with computer tomographic methods or optical methods. Further methods for determining measurement data to measure objects in the measurement volume can also be carried out, in particular methods which provide tomographic measurement data or measurement data relating to the coordinates of the surface.

In a further method step 208, a subregion of the measurement data is defined which corresponds to the at least one predetermined region of the evaluation rule. This step can comprise a reverse projection of the predetermined region onto the object representation. Alternatively or additionally, the subregion can be defined on the basis of a measurement parameter for the object at a defined position of the object, wherein the measurement parameter is calculated from one out of the multiplicity of image information elements.

In an optional method step 210, the subregion can be extended by a predefined safety margin. Measurement data which are disposed at a predefined distance from the subregion are integrated into the subregion.

In a further step 212, a first compression method is selected from a multiplicity of compression methods for a residual region of the measurement data outside the subregion. The first compression method has a compression rate which is higher than the at least one selected compression rate for the subregion.

In a step 214, at least one compression rate is further selected for the subregion on the basis of the evaluation rule. If the at least one selected compression rate for the subregion is higher than one, a second compression method is selected from the multiplicity of compression methods for the subregion on the basis of the evaluation rule. The evaluation rule can determine the second compression method depending on an analysis method that is to be carried out in the predetermined region.

Steps 212 and 214 can be carried out in any sequence or simultaneously.

In a next step 216, the subregion is compressed with the selected at least one compression rate. The measurement data in the subregion can be compressed with the second compression method if the selected at least one compression rate is higher than one.

A transitional region of the measurement data of the residual region can optionally be defined in a step 218. The transitional region separates the residual region from the subregion. The transitional region can extend around the subregion.

In this case, in a step 220, a third compression method can further be selected from the multiplicity of compression methods for the transitional region. The third compression method has a compression rate which is higher than the selected compression rate for the subregion, and is lower than the compression rate of the first compression method for the residual region. The compression rate in the transitional region can increase smoothly from the subregion to the residual region, i.e. different compression rates can be assigned to the different positions in the transitional region. The nearer the position is to the residual region, the higher the compression rate can be.

In a step 222, the measurement data in the transitional region can then optionally be compressed with the third compression method.

In a further step 224, the measurement data in the residual region can be compressed with the first compression method.

Steps 216, 222 and 224 can be carried out successively in any sequence or simultaneously.

Before the compression of the data, a filtering of the data can be carried out in order to reduce the noise of the data. As a result, higher compression rates can be used in which the filtered data can be losslessly stored. A deterioration in the resolution due to the widening of the point spread function can be alleviated by means of a predefined upper limit for the width of the point spread function. In this case, the data loss is restricted to an acceptable deterioration in the resolution.

The method 200 can be carried out by means of a computer program product on a computer. Instructions are sent to the computer which prompt the computer to carry out the method 200.

The invention is not restricted to one of the previously described embodiments, but is modifiable in a wide variety of ways.

All features and advantages arising from the claims, the description and the drawing, including structural details, spatial arrangements and method steps can be essential to the invention both individually and in a wide variety of combinations.

REFERENCE NUMBER LIST

100 Object representation
102 Sub-subregion
103 Sub-subregion
104 Subregion
106 Residual region
108 Projection point
110 Transitional region

The invention claimed is:

1. A computer-implemented method for compressing measurement data from a measurement of a measurement volume which comprises an object, wherein a digital representation of the object is generated by means of the measurement, wherein the digital representation of the object has a multiplicity of image information elements of the object, wherein the method comprises the following steps:
  providing an evaluation rule for at least one predetermined region in the measurement volume, characterized in that the evaluation rule is derived from a digital design drawing of the object, wherein the digital design drawing has tolerance values for the at least one predetermined region in the measurement volume,
  determining the measurement data in the measurement volume,
  defining a subregion of the measurement data corresponding to the at least one predetermined region of the evaluation rule,
  selecting at least one compression rate for the subregion on a basis of the evaluation rule;
  selecting a first compression method from a multiplicity of compression methods for a residual region of the measurement data outside the subregion, wherein the first compression method has a compression rate which is higher than the selected at least one compression rate for the subregion,
  compressing the subregion with the selected at least one compression rate, and
  compressing the measurement data in the residual region with the first compression method.

2. The method as claimed in claim 1, characterized in that the step of selecting the at least one compression rate for the subregion comprises:
  selecting a second compression method from the multiplicity of compression methods for the subregion on the basis of the evaluation rule if the selected at least one compression rate for the subregion is greater than one, and
  wherein the step of compressing the subregion with the selected at least one compression rate comprises:
  compressing the measurement data in the subregion with the second compression method.

3. The method as claimed in claim 1, characterized in that the evaluation rule comprises a definition of at least one analysis method which is to be carried out on the at least one predetermined region in the measurement volume, wherein the at least one analysis method which is to be carried out defines a target data quality for the at least one predetermined region.

4. The method as claimed in claim 3, characterized in that the evaluation rule determines a second compression method depending on an analysis method which is to be carried out in a predetermined region.

5. The method as claimed in claim 1, characterized in that, before the compression of the measurement data in the residual region, the method comprises the following steps:
  defining a transitional region of the measurement data of the residual region, wherein the transitional region separates the residual region from the subregion,
  selecting a third compression method from the multiplicity of compression methods for the transitional region, wherein the third compression method has a compression rate which is higher than the selected at least one compression rate for the subregion, and has a lower compression rate than the first compression method, and
  compressing the measurement data in the transitional region with the third compression method.

6. The method as claimed in claim 5, characterized in that the third compression method has a position-dependent compression rate, wherein the position dependent compression rate increases in the transitional region from the subregion to the residual region.

7. The method as claimed in claim 1, characterized in that, following the definition of the subregion of the measurement data corresponding to the at least one predetermined region of the evaluation rule, the method comprises the following step:

extending the subregion by a predefined safety margin.

8. The method as claimed in claim 1, characterized in that the image information elements indicate a value of a measurement parameter for the object at a defined position of the object.

9. The method as claimed in claim 1, characterized in that the image information elements indicate a value of a measurement parameter along a projection line through the object.

10. The method as claimed in claim 1, characterized in that the image information elements indicate a value of a distance to a nearest surface of the object.

11. The method as claimed in claim 9, wherein the step of defining a subregion of the measurement data corresponding to the at least one predetermined region of the evaluation rule comprises a reverse projection of the at least one predetermined region onto the digital representation of the object.

12. The method as claimed in claim 9, wherein the step of defining a subregion of the measurement data corresponding to the at least one predetermined region of the evaluation rule is performed on a basis of a measurement parameter for the object at a defined position of the object, wherein the measurement parameter for the object at a defined position of the object is calculated from one out of the multiplicity of image information elements.

13. The method as claimed in claim 1, characterized in that the method comprises the following step:

aligning a coordinate system of the measurement data with a coordinate system appropriate to the evaluation rule on a basis of a part of the measurement data before the compression of the measurement data.

14. A non-transitory computer program product with instructions executable on the computer which, when executed on a computer, prompt the computer to carry out the method as claimed in claim 1.

* * * * *